Mar. 5, 1929.　　　　E. S. COOK　　　　1,703,869
SPLIT REDUCTION DEVICE
Filed May 5, 1927
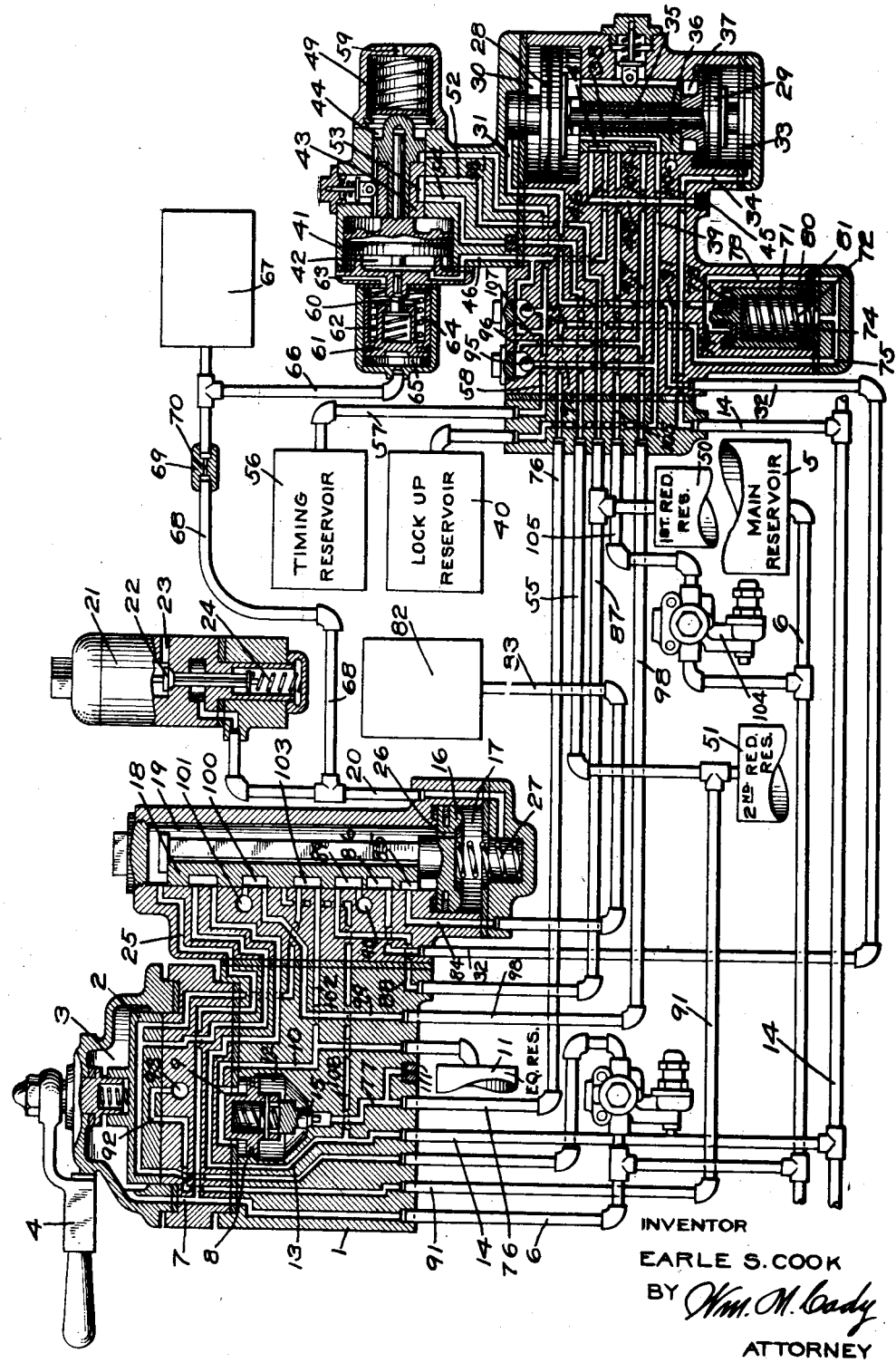
INVENTOR
EARLE S. COOK
BY Wm. M. Cady
ATTORNEY Patented Mar. 5, 1929.

1,703,869

UNITED STATES PATENT OFFICE.

EARLE S. COOK, OF WILMERDING, PENNSYLVANIA, ASSIGNOR TO WESTINGHOUSE AIR BRAKE COMPANY, OF WILMERDING, PENNSYLVANIA, A CORPORATION OF PENNSYLVANIA.

SPLIT REDUCTION DEVICE.

Application filed May 5, 1927. Serial No. 188,940.

This invention relates to fluid pressure brakes, and more particularly to a device for automatically effecting a reduction in brake pipe pressure in two stages and more especially in connection with an automatic train control equipment.

It has heretofore been proposed to provide means for effecting a reduction in brake pipe pressure in two stages, in which a first reduction reservoir is connected to the equalizing reservoir of an equalizing discharge valve mechanism to cause the first reduction in brake pipe pressure, and then a second reduction reservoir is connected to the equalizing reservoir to cause a second reduction in brake pipe pressure. With the previous device, the two reduction reservoirs are normally connected and the movement of a valve device is required to separate the two reservoirs when an application of the brakes is initiated. The result is that at the start of the initial or first reduction in brake pipe pressure, the equalizing reservoir may vent into the two reduction reservoirs instead of only into the first reduction reservoir.

One object of my invention is to provide means for ensuring the prompt separation of the two reduction reservoirs when an application of the brakes is started.

With previous devices, if the leakage from the brake pipe exceeds a predetermined rate, such that the equalizing discharge valve should fail to open, then the apparatus would fail to function so as to cause a two stage reduction in brake pipe pressure and the reduction would be effected in a single stage.

Another object of my invention is to provide a split reduction device in which the two stage reduction in brake pipe pressure will be secured regardless of the extent of leakage from the brake pipe.

Another object of my invention is to provide means for ensuring that sufficient time will elapse after the first reduction in brake pipe pressure has been made to permit the slack in the train to gather according to the length of the train, before the second reduction in brake pipe pressure will be started.

Another object of my invention is to provide means for preventing the time elapsing between the first and the second reductions in brake pipe pressure from exceeding a predetermined amount.

In the accompanying drawing, the single figure is a diagrammatic view, partly in section, of a brake equipment embodying my invention.

The equipment shown in the drawing is in general quite similar to that disclosed in the prior pending application of T. H. Thomas and E. S. Cook, Serial No. 109,044, filed May 14, 1926.

As shown in the drawing, the equipment may comprise a brake valve device 1 having a rotary valve 2, contained in valve chamber 3 and adapted to be operated by a handle 4. The valve chamber 3 is supplied with fluid under pressure from the usual main reservoir 5, through pipe 6 and passage 7. In the casing of the brake valve device is disposed an equalizing discharge valve mechanism comprising a piston 8 having chamber 9 at one side connected through passage 10 with the usual equalizing reservoir 11 and having chamber 12 at the opposite side connected through passage 13 with the usual brake pipe 14. The piston 8 is adapted to operate a brake pipe discharge valve 15, for venting fluid under pressure from the brake pipe 14.

Preferably associated with the brake valve device is an application valve device comprising a piston 16 contained in piston chamber 17 and a slide valve 18, contained in valve chamber 19 and adapted to be operated by said piston. Piston chamber 17 is connected to a pipe 20 which leads to a magnet valve device comprising an electro-magnet 21 and a valve 22.

The magnet 21 is controlled according to the traffic conditions and is energized when the traffic conditions are favorable and is deenergized when the traffic conditions are unfavorable.

When energized, the magnet 21 operates to close the valve 22 and cut off communication from pipe 20 to an atmospheric port 23, and when deenergized the valve 22 is opened by the acting of a spring 24 so as to permit fluid under pressure to be vented from piston chamber 17 by way of port 23.

The valve chamber 19 is charged with fluid at main reservoir pressure by way of passage 7 and passage 25, and from valve chamber 19, fluid equalizes through a restricted port 26 in piston 16 to piston chamber 17. When the valve 22 is held closed, the pressure in piston chamber 17 equalizes with that in valve chamber 19 and spring 27 then holds the piston 16 and valve 18 in the normal release position, as shown in the drawing.

The valve mechanism for controlling the two stage reduction in brake pipe pressure may comprise a controlling valve device having differential piston heads 28 and 29, the piston chamber 30 at the outer face of the larger piston 28 being connected to a passage 31 and pipe 32 which leads to the seat of the application slide valve 18. The piston chamber 33 at the outer face of the smaller piston 29 is connected, through a passage 34 with the brake pipe 14. The pistons 28 and 29 are connected by a stem 35 adapted to operate a slide valve 36 contained in valve chamber 37, intermediate the pistons 28 and 29. In the normal position of the controlling valve device, as shown in the drawing, valve chamber 37 is connected through a port 38 in the slide valve with a passage 39, leading to a lock-up reservoir 40.

When the application slide valve 18 is in release position, valve chamber 37 and the lock-up reservoir 40 are connected to the atmosphere through passage 39, passage 94, past check valve 95, passage 96, passage 97, pipe 98, passage 99, cavity 100 in slide valve 18 and exhaust port 101.

Associated with the controlling valve device is a valve device comprising a piston 41, contained in piston chamber 42 and a slide valve 43, contained in valve chamber 44 and adapted to be operated by piston 41.

In the normal position of slide valve 36, piston chamber 42 is connected to a restricted atmospheric exhaust port 45, through passage 46, cavity 47 in slide valve 36, and passage 48. A spring 49 acting on the stem of piston 41 tends to maintain said piston and the valve 43 in the left hand position, as shown in the drawing, in which the first reduction reservoir 50 is connected to the second reduction reservoir 51 through passage 52, cavity 53 in slide valve 43, passage 54, and pipe 55. A timing reservoir 56 is connected, through pipe 57 and passage 58 with valve chamber 44, which is open to the atmosphere by way of port 59.

For controlling the maximum time operation of piston 41 under certain conditions to be hereinafter described, a valve 60 is provided for controlling the venting of fluid from piston chamber 42.

Said valve is mounted in a piston device 61 which is subject to the pressure of a spring 62 tending to shift said piston so as to operate the valve 60 to open communication from piston chamber 42 to an atmospheric exhaust port 63, leading to chamber 64. The chamber 65 at the opposite side of piston 61 is connected by a pipe 66 to a reservoir 67, which reservoir is connected through a pipe 68, containing a choke plug 69 having a restricted port 70, with pipe 20.

Normally the reservoir 67 is charged with fluid under pressure supplied from piston chamber 17, when the magnet controlled valve 22 is seated. With the reservoir 67 charged with fluid under pressure, the piston 61 is maintained in the position shown in the drawing, so as to hold the valve 60 seated.

For controlling the minimum time operation of piston 41, under certain conditions to be hereinafter described, there is provided a valve piston 71, subject on one side to the pressure of a spring 72, tending to seat the piston against a seat ring 73.

The area of the valve piston within the seat ring is connected to passage 31 and pipe 32 and the chamber 74 at the spring side of the valve piston 71 is connected through passage 75 and pipe 76 with passage 77 in the brake valve device, through which fluid is vented from the brake pipe 14, by operation of the discharge valve 15. The chamber 74 is also connected when the valve piston 71 is in its upper position through a port 80 with a passage 78 which opens into the chamber 79 at the inner seated area of the valve piston. Passage 75 is also directly connected to passage 78 through a restricted port 81.

A reservoir 82 is connected to a pipe 83 and passage 84 leading to the seat of slide valve 18 and in the normal release position of the application slide valve 18, a cavity 85 connects passage 84 with valve chamber 19, so that the reservoir 82 is normally charged with fluid under pressure. When the slide valve 18 is moved to application position, the reservoir 82 is connected to pipe 32 through cavity 86 in the slide valve, so that fluid under pressure from reservoir 82 is supplied to chamber 79 of the valve piston 71 and to piston chamber 30 of piston 28.

In the normal release position of the application slide valve 18, the first reduction reservoir 50 is connected to the atmosphere through pipe 87, passage 88, cavity 89 in slide valve 18, and exhaust port 90. In the running position of the brake valve, the second reduction reservoir 51 is connected to the atmosphere, through pipe 91, cavity 92 in the rotary valve 2, and exhaust port 93. The engineer is thus compelled to move the brake valve device so as to cut off communication from the second reduction reservoir 51 to the atmosphere, otherwise the second reduction will be unlimited, since the pressure in the equalizing reservoir will continue to vent through the second reduction reservoir to the atmosphere at the port 93.

If the traffic conditions are unfavorable and the magnet 21 becomes deenergized, due to the action of the train control apparatus, the valve 22 is thereby unseated and fluid under pressure is vented from piston chamber 17, through pipe 20 to exhaust port 23.

Piston 16 is then shifted to its outer position and slide valve 18 is moved to application position, in which the equalizing reservoir 11 and chamber 9 of the equalizing discharge valve mechanism are connected to the first reduction reservoir 50, through passage 102, cavity 103 in slide valve 18, passage 88 and pipe 87. The pressure in the equalizing reservoir is thus reduced by equalization into the first reduction reservoir 50, according to the relative volumes of the reservoirs, and preferably such that the reduction in pressure will be about seven pounds.

The piston 8 of the equalizing discharge valve mechanism is then operated to open the valve 15, so that fluid is vented from the brake pipe 14 to the discharge passage 77. When the brake pipe pressure has been reduced to a degree slightly less than the reduced pressure in the equalizing reservoir 11, the piston 8 is operated to close the valve 15.

The movement of slide valve 18 to application position also causes the reservoir 82 to be connected to piston chamber 30 through passage 84, cavity 86 in slide valve 18, passage and pipe 32, and passage 31. The piston 28 is then operated by fluid pressure supplied to piston chamber 30 and slide valve 36 is shifted to a position in which piston chamber 42 is connected to a source of fluid pressure, such as a pressure less than main reservoir pressure as supplied from a reducing valve device 104, through pipe 105, passage 106, cavity 47 in slide valve 36, and passage 46.

The piston 41 is thus promptly shifted to the right by fluid under pressure, substantially as soon as the application slide valve 18 is moved to application position. In the right hand position, communication between passages 54 and 52 is cut off, so that the first reduction reservoir 50 is cut off from the second reduction reservoir 51, and venting of fluid from the equalizing reservoir only to the first reduction reservoir 50 is permitted.

Fluid at the reduced pressure supplied by the reducing valve device 104 also flows from passage 46 through a restricted port 107 to passage 58 and thence through pipe 57 to the timing reservoir 56, charging said reservoir at a predetermined rate, according to the size of the restricted port 107. The charging of said reservoir continues so long as the slide valve 36 is held in its lower position. The lock-up reservoir 40 is now charged with fluid from the brake pipe, as supplied through passage 108, cavity 100 in application slide valve 18, passage 99, pipe 98, passage 97, cavity 109 in slide valve 36, and passage 39. The movement of slide valve 36 also connects valve chamber 37 to the atmosphere, through port 38 and exhaust port 110, so that any fluid leaking into the valve chamber will be vented, and building up of pressure in said chamber will be prevented.

When fluid under pressure is supplied from reservoir 82 to piston chamber 30, it is also supplied to the inner seated area of the valve piston 71 and said valve piston is thereby shifted downwardly to its lower seat. If the equalizing discharge valve 15 should not open, due to excessive leakage from the brake pipe, then the valve piston 71 will remain in its lower position and fluid under pressure from the piston chamber 30 and the reservoir 82 will slowly be vented by way of passage 78, the restricted port 81, passage 75, and pipe 76 through the restricted exhaust port 111.

The size of the restricted port 81 is such as to reduce the pressure in the piston chamber 30 sufficiently to permit the brake pipe pressure in piston chamber 33 to effect the upward movement of the piston in a predetermined time, for example, ten seconds. During this time, the timing reservoir 56 is being charged with fluid under pressure, as hereinbefore described.

When the pistons 29 and 28 move upwardly after the predetermined time interval, the timing reservoir 56 starts to blow down through cavity 47 in slide valve 36, passage 48, and restricted exhaust port 45, and after a predetermined period, for example, ten seconds, the pressure in the timing reservoir 56 will have been reduced sufficiently to permit the piston 41 to be shifted to the left by the spring 49. The slide valve 43 is then shifted to the position shown in the drawing, in which the first reduction reservoir 50 is connected to the second reduction reservoir 51 through cavity 53 in the slide valve.

The second reduction in brake pipe pressure is then started by the equalization of the equalizing reservoir 11 into the second reduction reservoir 51 and the corresponding action of the equalizing discharge valve 15.

The fluid in reservoir 82 continues to blow down until the pressure of the spring 72 exceeds the fluid pressure acting on the upper face of the valve piston 71 and then said valve piston is shifted to its upper position, and fluid remaining in the reservoir 82 is more rapidly vented to passage 75, by way of the larger port 80, which is uncovered by the upward movement of the valve piston.

The flow area of the restricted port 81 is less than that of the restricted port 111, so that normally, the port 81 governs the time required to effect the blow down of fluid pressure in the reservoir 82, but in the case of a short train, the valve piston 71 will be held in its upper position, for although it will move downwardly when the reservoir 82 is initially connected to the upper face, the valve piston will be moved to its upper position when the discharge valve 15 opens. The rate of blow down from the reservoir 82 is then governed by the restricted port 111.

While the above described operation is taking place, fluid is also being vented from the reservoir 67 through the restricted port 70 to the exhaust port 23 and after a predetermined time, say thirty seconds, the pressure in the reservoir 67 and in chamber 65 will be reduced sufficiently to permit the piston 61 to be shifted outwardly by the spring 62. The valve 60 will then be unseated, and fluid under pressure will be vented from piston chamber 42 by way of the exhaust port 63.

If piston 41 has not previously been shifted to its outer position, it will now be shifted, so as to connect the first reduction reservoir 50 with the second reduction reservoir 51. The result is that if the second reduction in brake pipe pressure should be held back for a longer period than required to gather slack, then the piston 61 and valve 60 will function to effect the movement of the piston 41 to its second stage reduction position.

Having now described my invention, what I claim as new and desire to secure by Letters Patent, is:—

1. In a fluid pressure brake, the combination with a brake pipe, of means for effecting successive reductions in brake pipe pressure including a controlling valve device, a reservoir normally charged with fluid under pressure, and means operative to initiate the first reduction in brake pipe pressure and to supply fluid from said reservoir to said controlling valve device.

2. In a fluid pressure brake, the combination with a brake pipe, of means for effecting successive reductions in brake pipe pressure including a controlling valve device, a reservoir normally charged with fluid under pressure, means operative to initiate the first reduction in brake pipe pressure and to supply fluid from said reservoir to said controlling valve device, and means for venting fluid from said reservoir and said valve device at a predetermined rate.

3. In a fluid pressure brake, the combination with a brake pipe, of means for effecting successive reductions in brake pipe pressure including a timing reservoir, a controlling valve device operated by fluid under pressure for supplying fluid under pressure to said timing reservoir, a reservoir normally charged with fluid under pressure, and means operative to initiate the first reduction in brake pipe pressure and to supply fluid under pressure from said normally charged reservoir to said controlling valve device.

4. In a fluid pressure brake, the combination with a brake pipe, of means for effecting successive reductions in brake pipe pressure including a controlling valve device movable to one position by fluid under pressure, a discharge valve device for venting fluid under pressure from the brake pipe to a discharge passage having a restricted port open to the atmosphere, fluid under pressure from said controlling valve device being vented to said discharge passage through a restricted port, and means controlling a by-pass from said controlling valve device around said restricted port to said discharge passage.

5. In a fluid pressure brake, the combination with a brake pipe, of means for effecting successive reductions in brake pipe pressure including a timing reservoir, a controlling valve device operated by fluid under pressure for supplying fluid under pressure to said timing reservoir, a reservoir normally charged with fluid under pressure, and an application valve device operated upon a change in the signal indication for supplying fluid under pressure from said normally charged reservoir to said controlling valve device.

6. In a fluid pressure brake, the combination with a brake pipe, of means for effecting successive reductions in brake pipe pressure including a first reduction reservoir, a second reduction reservoir, a fluid pressure controlled valve device for controlling communication from the first to the second reduction reservoir, a valve means operated upon a predetermined reduction in fluid pressure for venting fluid from said valve device, and means operated upon a change in the signal indication for venting fluid from said valve means.

7. In a fluid pressure brake, the combination with a brake pipe, of means for effecting successive reductions in brake pipe pressure, means for delaying the start of the second reduction in brake pipe pressure for a time period after the first reduction has been completed, and means for ensuring the start of the second reduction after the lapse of a predetermined time period.

8. In a fluid pressure brake, the combination with a brake pipe, of means for effecting successive reductions in brake pipe pressure, a normally charged reservoir, means operated upon a predetermined reduction in fluid pressure in said reservoir for starting a second reduction in brake pipe pressure, a second normally charged reservoir, and additional means operated upon a predetermined reduction in pressure in the second reservoir for starting the second reduction in brake pipe pressure.

9. In a fluid pressure brake, the combination with a brake pipe, of means for effecting a reduction in brake pipe pressure in two stages including a fluid pressure controlled valve device movable to a position in which the second reduction in brake pipe pressure is started, a timing reservoir, the pressure in which acts on said valve device, a normally charged reservoir, means operated upon a predetermined reduction in pressure in said normally charged reservoir for venting fluid from said timing reservoir and said valve device, a second normally charged reservoir, and means operated upon a predetermined reduction in pressure in said second normally charged reservoir for venting fluid from said timing reservoir and said valve device.

10. In a fluid pressure brake, the combination with a brake pipe, of means for effecting a reduction in brake pipe pressure in two stages including a first reduction reservoir, a second reduction reservoir, a valve device operated upon a reduction in fluid pressure for connecting the first reduction reservoir with the second reduction reservoir, a controlling valve means for controlling the fluid pressure on said valve device, a normally charged reservoir, and means for supplying fluid under pressure from said normally charged reservoir to said controlling valve means.

11. In a fluid pressure brake, the combination with a brake pipe, of means for effecting a reduction in brake pipe pressure in two stages, including a controlling valve device operated by variations in fluid pressure, a reservoir, and an application valve device having one position in which said reservoir is charged with fluid under pressure and another position in which said reservoir is connected to said controlling valve device.

In testimony whereof I have hereunto set my hand.

EARLE S. COOK.